US009303974B2

(12) United States Patent
Capron et al.

(10) Patent No.: US 9,303,974 B2
(45) Date of Patent: Apr. 5, 2016

(54) ANGULAR RESOLUTION OF IMAGES USING PHOTONS HAVING NON-CLASSICAL STATES

(71) Applicant: The Boeing Company, Chicago, IL (US)

(72) Inventors: Barbara A. Capron, Sammamish, WA (US); Claudio G. Parazzoli, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 377 days.

(21) Appl. No.: 13/689,204

(22) Filed: Nov. 29, 2012

(65) Prior Publication Data

US 2014/0146323 A1    May 29, 2014

(51) Int. Cl.
*G01B 9/02*    (2006.01)
*H04B 10/70*    (2013.01)

(52) U.S. Cl.
CPC ............ *G01B 9/02041* (2013.01); *H04B 10/70* (2013.01); *G01B 2290/55* (2013.01)

(58) Field of Classification Search
CPC ........................... H04B 10/70; G01B 9/02041
See application file for complete search history.

(56) References Cited

U.S. PATENT DOCUMENTS

| 4,950,880 A | 8/1990 | Hayner |
| 6,005,513 A | 12/1999 | Hardesty |
| 2004/0100637 A1 | 5/2004 | Teich et al. |
| 2010/0290059 A1 | 11/2010 | Toshiyuki |

FOREIGN PATENT DOCUMENTS

| EP | 1750145 | 2/2007 |
| JP | 2007143085 | 6/2007 |

OTHER PUBLICATIONS

Ford et al., "Helicopter Ship Board Landing System," Proceedings of the 18th International Technical Meeting of the Satellite Division of the Institute of Navigation, Sep. 2005, 10 Pages.
Extended European Search Report, dated Apr. 4, 2014, regarding Application No. EP13193535.5, 9 pages.
Barnett et al., "Resolution in rotation measurements," Journal of Modern Optics, Jan. 2005, 12 pages.
Chen et al., "Study of non-classical light imaging technology," Nuclear Instruments and Methods in Physics Research A, vol. 637, No. 1, May 2011, pp. S130-S133.

*Primary Examiner* — Hwa Lee
(74) *Attorney, Agent, or Firm* — Yee & Associates, P.C.

(57) ABSTRACT

A method, apparatus, and system for improving the angular resolution of an image. A plurality of photon beams originating from a scene are received at a sensor system. Each of the plurality of photon beams is interfered with a corresponding source photon beam in a plurality of source photon beams to form a plurality of interference beams. Each of the plurality of source photon beams has a non-classical state. Fluctuations in a photon-number of the each of the plurality of source photon beams are reduced to within selected tolerances. An output signal is formed based on the plurality of interference beams. The output signal is configured for use in generating an image of the scene.

24 Claims, 6 Drawing Sheets

ANGULAR RESOLUTION OF IMAGES USING PHOTONS HAVING NON-CLASSICAL STATES

BACKGROUND INFORMATION

1. Field

The present disclosure relates generally to generating images, and in particular, to generating images using synthetic apertures. Still more particularly, the present disclosure relates to a method and apparatus for increasing a synthetic aperture baseline to improve the angular resolution of an image using photons having a non-classical state.

2. Background

Aperture synthesis, a form of interferometry, may include mixing light received through a collection of apertures to produce images that have a same angular resolution as an aperture having the size of the entire collection of apertures. In this manner, the collection of apertures forms a "synthetic aperture". As used herein, the "angular resolution" of an image is the minimum angular distance relative to the synthetic aperture between objects in the image at which those objects can be resolved, or distinguished. The angular resolution of an image may be expressed in radians, degrees, arcminutes, arcseconds, or some other unit of angular measurement.

The angular resolution of an image generated using a synthetic aperture may be determined by the baseline of the synthetic aperture. As used herein, the "baseline" of a synthetic aperture is the maximum physical separation between the apertures that make up the synthetic aperture along a line normal to the direction of the object relative to the synthetic aperture. Increasing the baseline may increase the angular resolution.

With some currently available synthetic apertures, photons received through, for example, a pair of apertures in the synthetic aperture may be transported to a same location and physically interfered with each other. The maximum baseline for these types of synthetic apertures may be limited by the potential for the loss of photons and/or phase information along the transmission lines used to transport the photons. These transmission lines may take the form of, but are not limited to, optical fibers, vacuum pipes, and/or other types of transmission lines.

With these types of transmission lines, as the distance that the photons need to travel increases, the potential for the loss of photons and/or phase information also increases. Consequently, the limits to the maximum baseline that can be achieved may limit the angular resolution that can be achieved. For example, some currently available synthetic aperture systems may be unable to produce images having an angular resolution of less than about one nanoradian.

In some cases, the baseline for a synthetic aperture may be increased using quantum teleportation. In particular, quantum teleportation may be used to transfer the state of first photons received through a first aperture to second photons received through a second aperture without physically transporting the first photons to the second photons. Quantum teleportation may be performed using entangled photons from a local source.

Quantum teleportation may allow longer baselines to be achieved when compared to physically interfering the photons received through apertures with each other. However, the maximum baseline that can be achieved may still be constrained by the limited number of entangled photons that can be emitted from the local source during a given time interval. Further, fluctuations in the number of entangled photons that may be emitted during a given point in time may require more measurements than desired to be generated to produce an image. Additionally, these fluctuations may increase the minimum brightness of an object that can be imaged more than desired. Therefore, it would be desirable to have a method and apparatus that takes into account at least some of the issues discussed above, as well as other possible issues.

SUMMARY

In one illustrative embodiment, a method is provided in which a plurality of photon beams originating from a scene are received at a sensor system. Each of the plurality of photon beams is interfered with a corresponding source photon beam in a plurality of source photon beams to form a plurality of interference beams. Each of the plurality of source photon beams has a non-classical state. Fluctuations in a photon-number of the each of the plurality of source photon beams are reduced to within selected tolerances. An output signal is formed based on the plurality of interference beams. The output signal is configured for use in generating an image of the scene.

In another illustrative embodiment, an apparatus comprises a photon source and a sensor system. The photon source is configured to emit source photons having a non-classical state. The source photons are configured to be distributed as a plurality of source photon beams. Fluctuations in a photon-number of each of the plurality of source photon beams are reduced to within selected tolerances. The sensor system is configured to receive a plurality of photon beams originating from a scene. The sensor system is configured to interfere each of the plurality of photon beams with a corresponding source photon beam in the plurality of source photon beams to form a plurality of interference beams. The sensor system is configured to form an output signal based on the plurality of interference beams. The output signal is configured for use in generating an image of the scene.

In yet another illustrative embodiment, a system comprises a synthetic aperture, an interference system, and a detector system. The synthetic aperture is configured to receive a plurality of photon beams originating from a scene. An interference system is configured to interfere each of the plurality of photon beams with a corresponding source photon beam in a plurality of source photon beams having a non-classical state to form a plurality of interference beams. Fluctuations in a photon-number of each of the plurality of source photon beams are reduced to within selected tolerances. The detector system is configured to detect the plurality of interference beams. An output signal configured for use in generating an image of the scene is formed in response to detection of the plurality of interference beams.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a synthetic aperture with a baseline sufficiently long to allow an image to be constructed having a desired angular resolution. The desired angular resolution may be, for example, without limitation, an angular distance relative to the synthetic aperture that is less than about one nanoradian.

Further, the illustrative embodiments recognize and take into account that non-classical states of light may allow fluctuations within the photon-number for the light to be reduced to within selected tolerances. The photon-number may be the number of photons that encounter a particular two-dimensional area at a given point in time or the mean number of photons that encounter the particular two-dimensional area during a given time interval. The illustrative embodiments recognize and take into account that a non-classical state of light, such as squeezed light, may be controlled such that fluctuations in the photon-number of the squeezed light are reduced to within selected tolerances.

The illustrative embodiments recognize and take into account that reducing the fluctuations in the photon-number of the light may allow longer baselines of synthetic apertures to be achieved. In this manner, the angular resolution of the images generated using these synthetic apertures may be improved.

Thus, the illustrative embodiments provide a sensor system and an image generator that may be used to generate images having improved angular resolution. The illustrative embodiments provide a method, apparatus, and system for generating an image having improved angular resolution.

In one illustrative embodiment, a plurality of photon beams originating from a scene are received at a sensor system. Each of the plurality of photon beams is interfered with a corresponding source photon beam in a plurality of source photon beams to form a plurality of interference beams. Each of the plurality of source photon beams has a non-classical state. Fluctuations in a photon-number of the each of the plurality of source photon beams are reduced to within selected tolerances. An output signal is formed based on the plurality of interference beams. The output signal is configured for use in generating an image of the scene. The image may have an improved angular resolution. For example, without limitation, the angular resolution of the image may be an angle of less than about one nanoradian.

Figure 1:
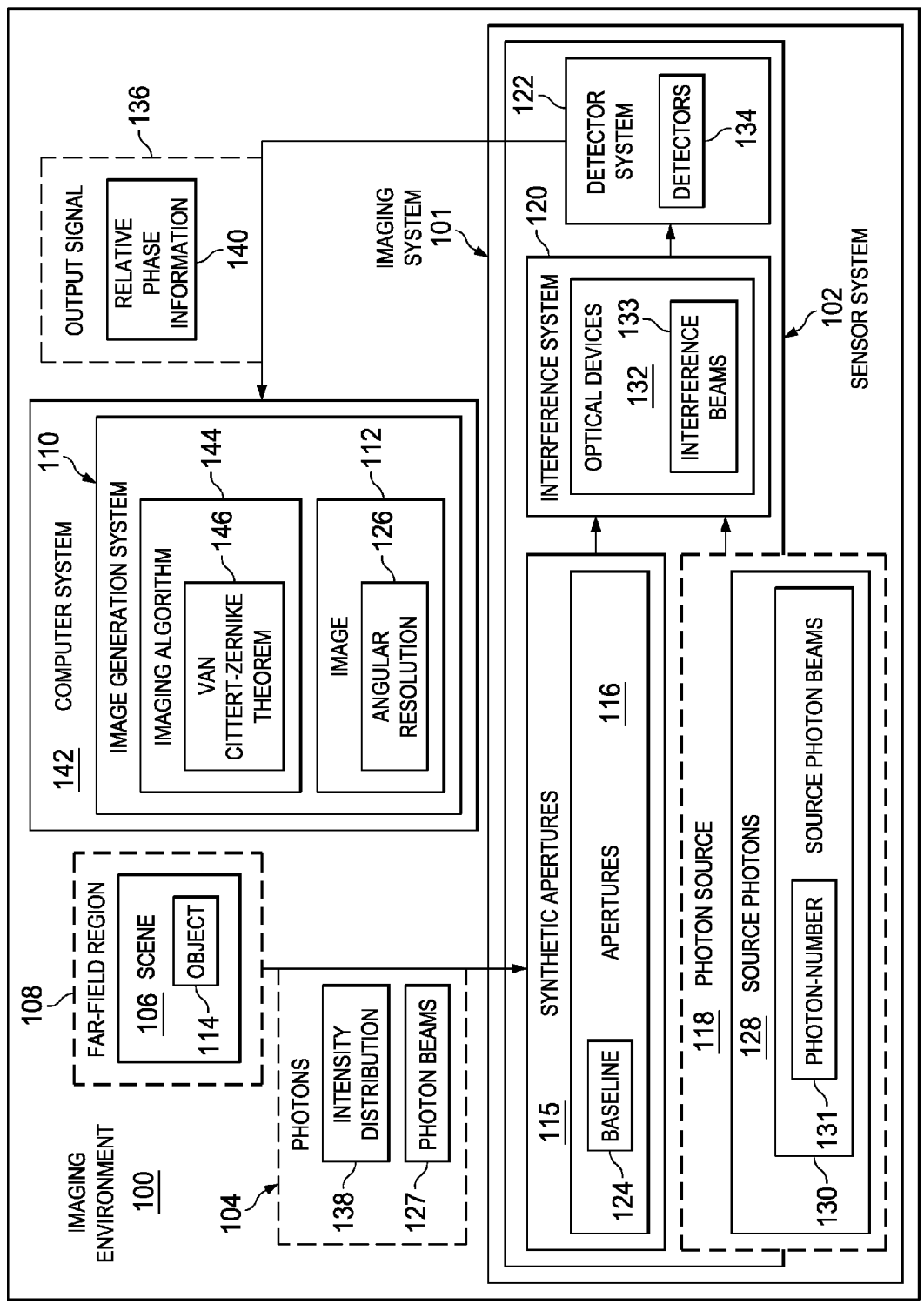
FIG. 1 is an illustration of an imaging environment in the form of a block diagram in accordance with an illustrative embodiment.

Referring now to the figures, and in particular, with reference to FIG. 1, an illustration of an imaging environment in the form of a block diagram is depicted in accordance with an illustrative embodiment. In FIG. 1, the imaging environment 100 includes an imaging system 101. The imaging system 101 may be used to generate images of a scene 106. As depicted, the imaging system 101 may include a sensor system 102, an image generator 110, and a photon source 118.

The sensor system 102 may be configured to measure the photons 104 originating from the scene 106. The image generator 110 may be configured to generate an image 112 of the scene 106 using the measurements of the photons 104 formed by the sensor system 102.

For example, the image generator 110 may be configured to generate an image 112 of an object 114 in the scene 106. In one illustrative example, the scene 106 is located in a far-field region 108 with respect to the sensor system 102. In this illustrative example, the object 114 may be referred to as a distant object. The photons 104 received at the sensor system 102 may be, for example, photons emanating from the object 114.

As depicted, the sensor system 102 may include a synthetic aperture 115, an interference system 120, and a detector system 122. In some cases, the photon source 118 in the imaging system 101 may be considered part of the sensor system 102. However, in other illustrative examples, the photon source 118 may be considered separate from the sensor system 102. The photon source 118 may also be referred to as a local photon source.

The synthetic aperture 115 in the sensor system 102 may be formed by a plurality of apertures 116 that are configured to receive the photons 104 from the scene 106. As used herein, an "aperture" such as one of the apertures 116 that form the synthetic aperture 115, is an opening or space through which light is allowed to pass.

In these illustrative examples, each of the apertures 116 in the sensor system 102 is physically separated from the other apertures. The apertures 116 may be arranged in any pattern. For example, the apertures 116 may be arranged in the form of an array.

In one illustrative example, each of the apertures 116 may belong to a different optical system. These optical systems may take the form of, for example, without limitation, optical telescopes, optical receiver systems, and/or other types of optical systems. In other illustrative examples, two or more of the apertures 116 may belong to the same optical system.

The maximum physical separation between the apertures 116 is the baseline 124 of the apertures 116. The baseline 124 may determine the separation between the near-field region and the far-field region 108 with respect to the sensor system 102. For example, the far-field region 108 may be greater than about twice the baseline 124 squared over the wavelength of the photons 104 from the scene 106. The near-field region may be less than about twice the baseline 124 squared over the wavelength of the photons 104 from the scene 106.

Further, the baseline 124 of the apertures 116 determines the angular resolution 126 of the image 112 that is produced by image generator 110. The angular resolution 126 may be the minimum angular distance relative to the synthetic aperture 115 between distinguishable objects in the image 112. The angular resolution 126 may be expressed in, for example, without limitation, radians, arcseconds, or some other type of unit of angular measurement. The smaller the angle of the angular resolution 126, the better the angular resolution 126.

The relationship between the angular resolution 126 of the image 112 and the baseline may be given as follows:

$$R=\lambda/B$$

where R is the angle of the angular resolution 126 expressed in radians, λ is the wavelength of the photons 104, and B is the baseline 124 of the apertures 116. The wavelength, λ, and the baseline 124, B, may be expressed in the same units.

Increasing the baseline 124 of the apertures 116 decreases the angle of the angular resolution 126, thereby improving the angular resolution 126. In these illustrative examples, the sensor system 102 is configured to increase the baseline 124 of the apertures 116 such that the angular resolution 126 of the image 112 may be improved.

As depicted, the photons 104 originating from the scene 106 may be received through the apertures 116 in the form of a plurality of photon beams 127. Each of these photon beams 127 may be comprised of one or more photons that emanate from, for example, without limitation, the object 114 in the scene 106. In particular, each of the photon beams 127 may pass through a corresponding one of the apertures 116.

The photon-number of each of these photon beams 127 may fluctuate more than desired. As used herein, the "photon-number" of a photon beam may be the number of photons in that beam that encounter a particular two-dimensional area at a given point in time. In some cases, the photon-number of a photon beam may be considered the mean number of photons in the beam that encounter the two-dimensional area during a given time interval. In these cases, the photon-number may be referred to as a mean photon-number.

Fluctuations in the photon-number of each of the photon beams 127 may be statistically described as the variance in the photon-number. When the variance in the photon-number is outside of selected tolerances, the number of measurements that need to be taken by the sensor system 102 in order to form the image 112 of the scene 106 may be greater than desired. Further, when this variance is outside of selected tolerances, the number of photons from the object 114 that are needed in order to reconstruct the image 112 of the object 114 may be increased. Consequently, the dimness of the object 114 may limit the ability to reconstruct the image 112 of the object 114.

However, interference of the photon beams 127 received through the apertures 116 with other photon beams having an increased number of photons and reduced fluctuations in photon-number may improve the overall statistics of the photon beams 127. In these illustrative examples, the photon source 118 in the sensor system 102 is configured to emit source photons 128 which may be interfered with the photons 104 in the photon beams 127.

In one illustrative example, the photon source 118 may be positioned at a center of the synthetic aperture 115. Of course, in other illustrative examples, the photon source 118 may be positioned at an edge of the synthetic aperture 115. In some cases, the photon source 118 may be separate from the sensor system 102 but may be positioned at a center of the sensor system 102.

The photon source 118 emits source photons 128 having a non-classical state. When the source photons 128 have a wavelength within the visible range, infrared range, near-infrared range, ultraviolet range, or some other light range, the source photons 128 may take the form of non-classical light. As used herein, photons having a "non-classical state" may be photons that exhibit quantum noise. Further, a non-classical state for photons may be described as any state in which a density matrix of the photons does not match a probability density function. The non-classical state may be, for example, without limitation, a squeezed state or some other type of non-classical state.

The number of source photons 128 emitted by the photon source 118 may be sufficiently high to consider the photon source 118 a strong bright source. In other words, the photon-number 131 of each of the source photon beams 130 that are formed from the source photons 128 may be higher than some selected threshold. As one illustrative example, the photon-number 131 may be greater than about 1000 photons. In some cases, the photon-number 131 may be greater than about 10,000 photons.

The source photons 128 emitted by the photon source 118 may be distributed in the form of a plurality of source photon beams 130. This distribution may be performed in a number of different ways. In an illustrative example, the photon source 118 may be a device comprised of a plurality of laser heads, each configured to emit a different source photon beam. In another illustrative example, the source photons 128 emitted by the photon source 118 may be split into the source photon beams 130 by one or more beam splitters.

In these illustrative examples, the source photon beams 130 may be formed in a manner such that the relative phase between the source photon beams 130 is known. In one illustrative example, the relative phase between the source photon beams 130 may be substantially zero.

For example, in some cases, the photon source 118 may be a coherent source. A coherent source may be a device that emits photon beams having the same frequency, wavelength, and phase. In other words, the photon beams emitted by the coherent source may be "phase-locked." When the photon source 118 is a coherent source, the relative phase between the source photon beams 130 may be substantially zero.

Additionally, the photon source 118 may be configured to reduce fluctuations in the photon-number 131 of the source photon beams 130 to within selected tolerances. For example, when the photon source 118 emits the source photons 128 having a squeezed state, the squeezed state of the source photons 128 may allow the statistics with respect to the photon-number 131 of the source photon beams 130 formed by the source photons 128 to be controlled within selected ranges. For example, the photon source 118 may be configured such that the statistical variance in the photon-number 131 of each of the source photon beams 130 formed by the source photons 128 over time is reduced to within selected tolerances.

Each of the photon beams 127 received through the synthetic aperture 115 may be interfered with a corresponding source photon beam of the source photon beams 130 to form a plurality of interference beams 133. The interference of the photon beams 127 with the corresponding source photon beams 130 may be performed using the interference system 120 in the sensor system 102. The interference system 120 may be comprised of a plurality of optical devices 132. In one illustrative example, each of the photon beams 127 may be interfered with a corresponding one of the source photon beams 130 at one of the optical devices 132. The optical devices 132 may take the form of, for example, without limitation, beam splitters.

Interfering the source photon beams 130 emitted by the photon source 118 with the photon beams 127 received through the apertures 116 may improve the statistical variance in the photon-number of each of the photon beams 127. In other words, the source photon beams 130 may be used to strengthen or enhance the photon beams 127 received through the apertures 116.

Additionally, interference of the photon beams 127 with the source photon beams 130 having the reduced fluctuations in photon-number 131 may cause a reduction in the relative phase between the photon beams 127 and the source photon beams 130. In particular, the relative phase between one of the photon beams 127 and a corresponding one of the source photon beams 130 interfered with that photon beam may be reduced in response to the reduced fluctuations in the photon-number 131 of the corresponding source photon beam.

In this manner, the accuracy of the phase information identified using the interference beams 133 formed may be increased. Further, the phase information identified using the interference beams 133 may have a desired level of accuracy even when the photon beams 127 each only contain one to five photons.

This increase in the level of accuracy that may be achieved when identifying phase information from the interference beams 133 may reduce the number of measurements that need to be taken by the sensor system 102 to generate image 112 having a desired angular resolution 126. Further, the usage of the source photon beams 130 allows images of dimmer objects in the scene 106 to be reconstructed.

Additionally, using the source photon beams 130 to strengthen the photon beams 127 received through the apertures 116 allows the baseline 124 of the apertures 116 to be increased and thereby, the angular resolution 126 of the image 112 to be improved. The baseline 126 of the apertures 116 may be increased to over, for example, without limitation, 0.1 kilometers, 10 kilometers, 100 kilometers, or some other sufficiently long distance.

As one illustrative example, each of the optical devices 132 in the interference system 120 may be positioned near a corresponding one of the apertures 116. Each of the source photon beams 130 may be transported to the corresponding one of the optical devices 132 such that the source photon beam may be interfered with the corresponding photon beam. The intensity of the source photon beam may be sufficiently high such that any photon loss during the transporting of the photons in the source photon beam to the optical devices 132 may be within selected tolerances.

In this manner, the photon beams 127 received through the apertures 116 do not need to be transported over longer distances to reach the optical devices 132 in the interference system 120. Instead, the source photon beams 130 may be transported over the longer distances.

The interference beams 133 formed by interfering the source photon beams 130 with the photon beams 127 received through the apertures 116 may be detected by the detector system 122. The detector system 122 may include a plurality of detectors 134. These detectors 134 may convert the light in the interference beams into electrical signals. In particular, the electrical signals may be, for example, current signals, also referred to as photocurrent signals. These current signals may be used to form an output signal 136.

The output signal 136 formed by the detector system 122 may be a transformation of the intensity distribution 138 of the photons 104 from the scene 106. In particular, the output signal 136 may be a Fourier transform of the intensity distribution 138 of the photons 104 from the scene 106.

Further, the output signal 136 may contain relative phase information 140 for the photon beams 127 received through the apertures 116. In one illustrative example, the relative phase information 140 identifies the overall variation in phase between the photon beams 127 received through the apertures 116.

The image generator 110 is configured to receive and process the output signal 136 to form the image 112 of the scene 106. For example, the image generator 110 may sample the output signal 136 to identify measurements of the photons 104 received at the sensor system 102. The image generator 110 may use these measurements and an imaging algorithm 144 to identify the intensity distribution 138 of the photons 104 from the scene 106 to form the image 112. The imaging algorithm 144 may be based on, for example, without limitation, the Van Cittert-Zernike theorem (VCZT) 146.

The image 112 constructed by the image generator 110 based on the output signal 136 received from the detector system 122 may have an angular resolution 126 within the desired range. As one illustrative example, the angular resolution 126 of the image 112 may be an angle that is less than about one nanoradian.

In these illustrative examples, the image generator 110 may be implemented using hardware, software, or a combination of the two. In one illustrative example, the image generator 110 may be implemented in a computer system 142.

This computer system 142 may be implemented using one or more computers. When more than one computer is present in the computer system 142, these computers may be in communication with each other. A computer in the computer system 142 may be implemented using a data processing system, for example, without limitation, data processing system 700 in FIG. 7.

In other illustrative examples, the image generator 110 may be implemented using a processor unit, an integrated circuit, a microchip, or some other type of processing hardware. As depicted in these examples, the image generator 110 may be separate from the sensor system 102. However, in other illustrative examples, the image generator 110 may be part of the sensor system 102.

Figure 2:
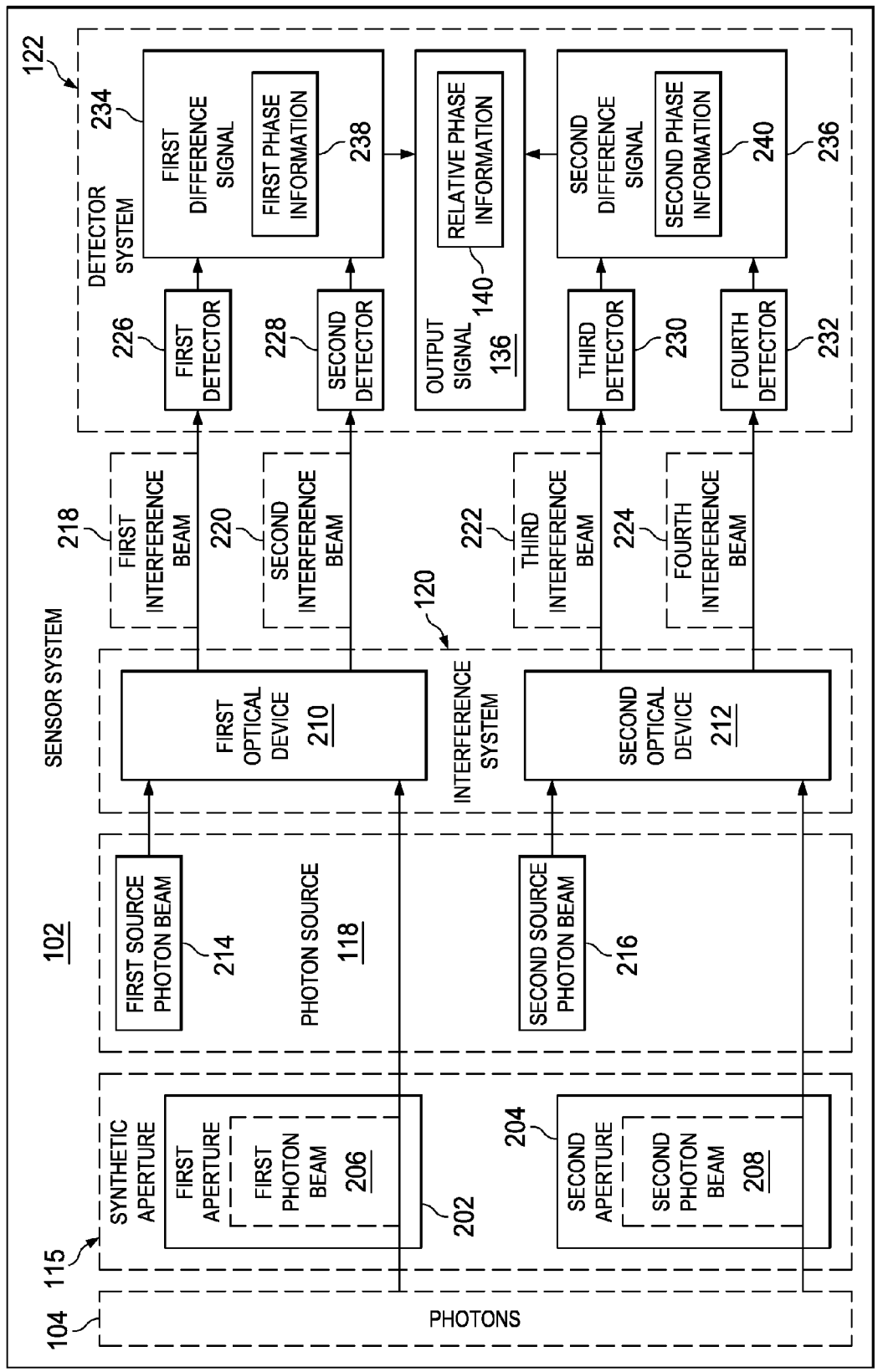
FIG. 2 is an illustration of one configuration for a sensor system in the form of a block diagram in accordance with an illustrative embodiment.

With reference now to FIG. 2, an illustration of one configuration in the form of a block diagram for the sensor system 102 from FIG. 1 is depicted in accordance with an illustrative embodiment. In this illustrative example, the synthetic aperture 115 of the sensor system 102 includes a first aperture 202 and a second aperture 204. The first aperture 202 and the second aperture 204 may be examples of one implementation for the apertures 116 in FIG. 1.

The first aperture 202 and the second aperture 204 are configured to receive a first photon beam 206 and a second photon beam 208, respectively. The first photon beam 206 and the second photon beam 208 may be examples of one implementation for the photon beams 127 that form photons 104 in FIG. 1.

As depicted, the first photon beam 206 arrives at a first optical device 210 in the interference system 120, while the second photon beam 208 arrives at a second optical device 212 in the interference system 120. The first optical device 210 and the second optical device 212 may be examples of one implementation for the optical devices 132 in the interference system 120 in FIG. 1.

Further, the photon source 118 may be configured to emit a first source photon beam 214 and a second source photon beam 216. The first source photon beam 214 and the second source photon beam 216 may be examples of one implementation for the source photon beams 130 in FIG. 1.

As depicted, the first source photon beam 214 may be interfered with the first photon beam 206 at the first optical device 210 to form a first interference beam 218 and a second interference beam 220. The second source photon beam 216 may be interfered with the second photon beam 208 at the second optical device 212 to form a third interference beam 222 and a fourth interference beam 224. The first interference beam 218, the second interference beam 220, the third interference beam 222, and the fourth interference beam 224 may be examples of one implementation for the interference beams 133 in FIG. 1.

The first interference beam 218 and the second interference beam 220 may be detected by a first detector 226 and a second detector 228, respectively, of the detector system 122. Further, the third interference beam 222 and the fourth interference beam 224 may be detected by a third detector 230 and a fourth detector 232, respectively, of the detector system 122. The first detector 226, the second detector 228, the third detector 230, and the fourth detector 232 may be examples of one implementation for the detectors 134 in the detector system 122 in FIG. 1.

The difference between the outputs of the first detector 226 and the second detector 228 may be used to form a first difference signal 234. The difference between the outputs of the third detector 230 and the fourth detector 232 may be used to form a second difference signal 236.

The first difference signal 234 may include first phase information 238 for the first photon beam 206 received through the first aperture 202. This first phase information 238 may identify the relative phase between the first photon beam 206 and the first source photon beam 214. The second phase information 240 may identify the relative phase between the second photon beam 208 and the second source photon beam 216.

The difference between the first difference signal 234 and the second difference signal 236 may then be used to form the output signal 136 containing the relative phase information 140. This relative phase information 140 identifies the relative phase between the first photon beam 206 and the second photon beam 208.

This output signal 136 may be sent to the image generator 110 in FIG. 1. The output signal 136 may be sampled over time to form a plurality of measurements of the photons 104 received from the scene 106 in FIG. 1. These measurements may then be used to form the image 112 of the scene 106 and, in particular, the object 114 in the scene 106 in FIG. 1.

The illustrations of the imaging environment 100 in FIG. 1 and the sensor system 102 in FIG. 2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, the synthetic aperture 115 in the sensor system 102 may be formed by more than two apertures. In one illustrative example, the synthetic aperture 115 may be formed by 10, 20, 30, or some other number of apertures.

Further, in other illustrative examples, other optical devices and/or components may be also present within the sensor system 102. For example, the sensor system 102 may include one or more phase shifters configured to adjust the phases of the source photon beams 130 prior to the source photon beams 130 being interfered with the photon beams 127 received through the apertures 116.

Figure 3:
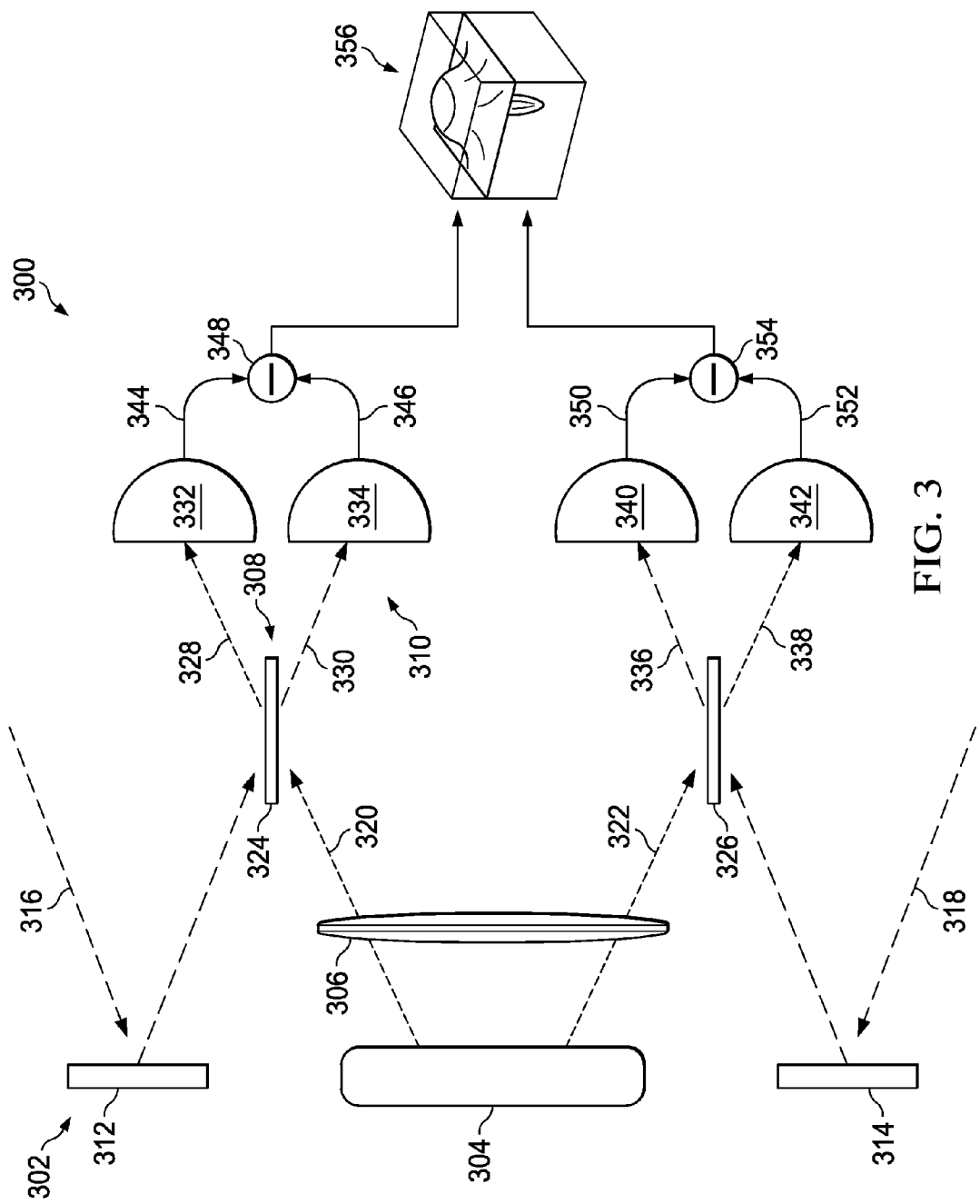
FIG. 3 is an illustration of a schematic representation of the sensor system in accordance with an illustrative embodiment.

With reference now to FIG. 3, an illustration of a schematic representation of a sensor system is depicted in accordance with an illustrative embodiment. The schematic representation of a sensor system 300 in FIG. 3 may be an example of one manner in which the sensor system 102 in FIGS. 1-2 may be implemented.

In this illustrative example, the sensor system 300 includes a synthetic aperture 302, a coherent source 304, a phase-shifter 306, an interference system 308, and a detector system 310. The synthetic aperture 302 comprises a first aperture 312 and a second aperture 314. A first photon beam 316 passes through the first aperture 312 and a second photon beam 318 passes through the second aperture 314. These two photon beams may include photons emanating from a distant object.

The first photon beam is interfered with a first source photon beam 320 emitted by the coherent source 304 at a first beam splitter 324 of the interference system 308. The second photon beam is interfered with a second source photon beam 322 emitted by the coherent source 304 at a second beam splitter 326 of the interference system 308. The phases of the first source photon beam 320 and second source photon beam 322 are adjusted by the phase-shifter 306 prior to the interference of these source photon beams with the first photon beam 316 and the second photon beam 318, respectively.

In this illustrative example, the coherent source 304 is configured to reduce the statistical variance in the photon-number for each of the first source photon beam 214 and the second source photon beam 216. Further, the coherent source 304 may be a very bright source. In other words, the coherent source 304 may have an intensity that is greater than some selected threshold.

The intensity of the coherent source 304 may be based on the number of photons emitted per second. As the number of photons emitted per second increases, the intensity of the coherent source 304 increases. In this illustrative example, the selected threshold for the intensity of the coherent source 304 may be the intensity that corresponds to greater than about 1000 photons emitted per second. In some cases, the selected threshold for the intensity of the coherent source 304 may be the intensity that corresponds to greater than about 10,000 photons emitted per second.

Further, in this illustrative example, the photons emitted by the coherent source 304 may have a non-classical state. For example, the photons may have a squeezed state. Using a non-classical state, such as, but not limited to, a squeezed state, may allow an increased signal-to-noise ratio to be achieved. In particular, using a non-classical state, such as, but not limited to, a squeezed state, may allow quantum noise to be reduced below the standard quantum limit of about $$\frac{1}{\sqrt{N}}$$

to about $$\frac{1}{N},$$

wherein N is the mean photon-number. For example, the minimum quantum noise may be reduced to $$\frac{1}{N^k}.$$

The first beam splitter 324 forms a first interference beam 328 and a second interference beam 330. The first interference beam 328 and the second interference beam 330 are detected by a first detector 332 and a second detector 334, respectively, of the detector system 310. The second beam splitter 326 forms a third interference beam 336 and a fourth interference beam 338. The third interference beam 336 and the fourth interference beam 338 are detected by a third detector 340 and a fourth detector 342, respectively, of the detector system 310.

The current signal 344 output from the first detector 332 and the current signal 346 output from the second detector 334 are differenced to form a first difference signal 348. The current signal 350 output from the third detector 340 and the current signal 352 output from the fourth detector 342 are differenced to form a second difference signal 354. The first difference signal 348 and the second difference signal 354 may be differenced to form the output signal 356.

The first difference signal 348 may identify the relative phase between the first photon beam 316 and the first source photon beam 320. The second difference signal 354 may identify the relative phase between the second photon beam 318 and the second source photon beam 322. In this manner, taking the difference between these two difference beams eliminates the contribution of the two source photon beams such that the output signal 356 identifies the relative phase between the first photon beam 316 and the second photon beam 318.

Figure 4:
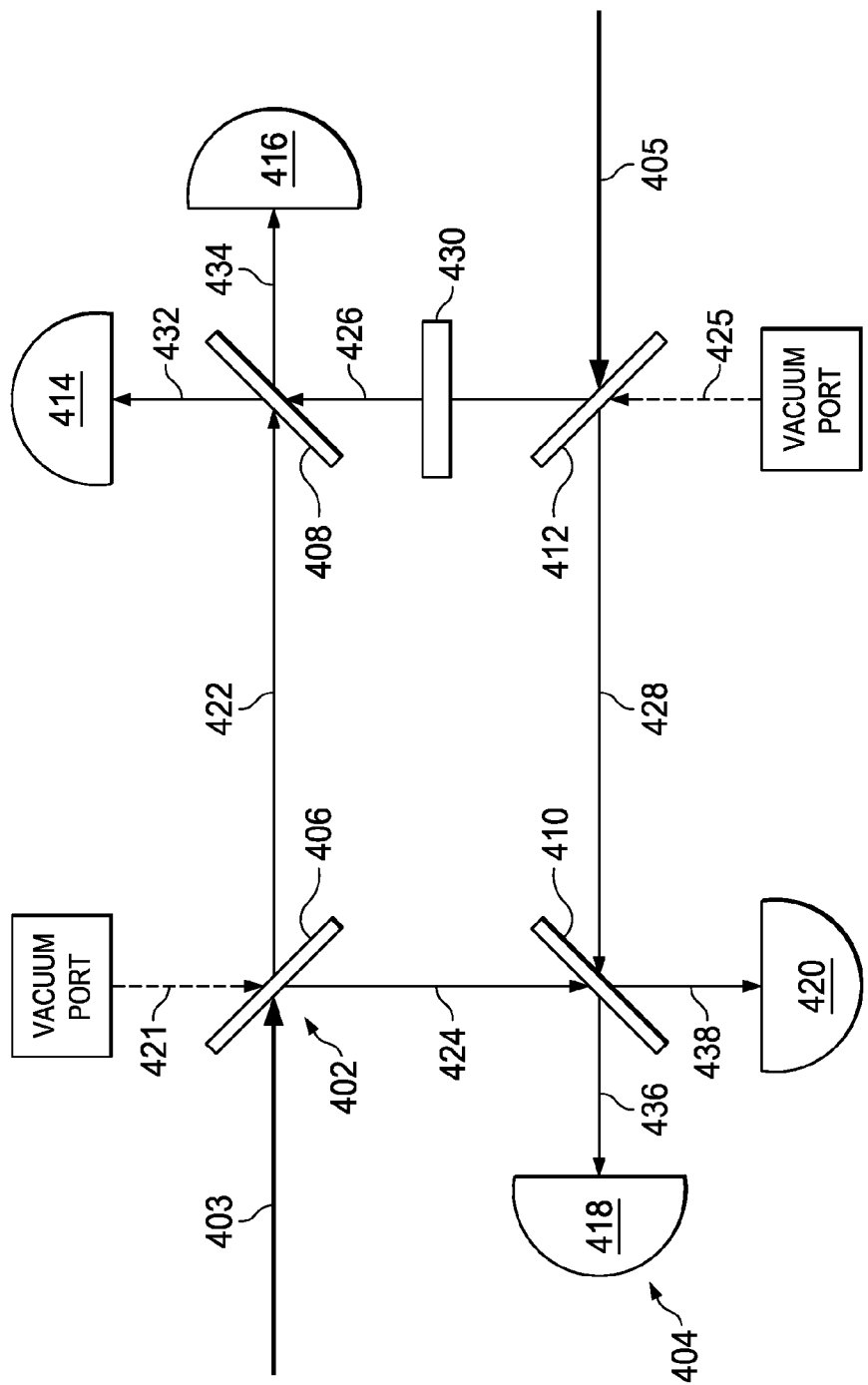
FIG. 4 is an illustration of interference performed using multiple beam splitters per aperture in accordance with an illustrative embodiment.

With reference now to FIG. 4, an illustration of interference performed using multiple beam splitters per aperture is depicted in accordance with an illustrative embodiment. In this illustrative example, a group of beam splitters 402 is used to interfere a photon beam 403 received through an aperture with a source photon beam 405. The resulting interference beams are detected by a group of detectors 404.

As depicted, the group of beam splitters 402 includes a first beam splitter 406, a second beam splitter 408, a third beam splitter 410, and a fourth beam splitter 412. The group of detectors 404 includes a first detector 414, a second detector 416, a third detector 418, and a fourth detector 420.

The photon beam 403 is split into first split photon beam 422 and second split photon beam 424 by the first beam splitter 406. In this illustrative example, the vacuum port 421 indicates that the only input to the first beam splitter 406 is the photon beam 403.

The source photon beam 405 is split into first split source photon beam 426 and second split source photon beam 428 by the fourth beam splitter 412. In this illustrative example, the vacuum port 425 indicates that the only input to the fourth beam splitter 406 is the source photon beam 405. The phase of the first split source photon beam 426 is controlled using a phase-shifter plate 430. In this illustrative example, the phase-shifter plate 430 may change the phase of the first split source photon beam 426 by about one fourth of the wavelength of the first split source photon beam 426.

The first split photon beam 422 and the first split source photon beam 426 are interfered at the second beam splitter 408. A first interference beam 432 and a second interference beam 434 are formed by this interference. The first interference beam 432 and the second interference beam 434 are detected by the first detector 414 and the second detector 416, respectively.

Additionally, the second split photon beam 424 and the second split source photon beam 428 are interfered at the third beam splitter 410. A third interference beam 436 and a fourth interference beam 438 are formed by this interference. The third interference beam 436 and the fourth interference beam 438 are detected by the third detector 418 and the fourth detector 420, respectively.

In this manner, interference between the photon beam 403 and the source photon beam 405 may be performed at two different beam splitters instead of at a single beam splitter. This type of configuration may help reduce phase ambiguity. Of course, any number of beam splitters and/or other optical devices may be used to cause the interference between the photon beam 403 and the source photon beam 405.

The illustrations of the sensor system 300 in FIG. 3 and the group of beam splitters 402 and the group of detectors 404 in FIG. 4 are not meant to imply physical or architectural limitations to the manner in which an illustrative embodiment may be implemented. Other components in addition to or in place of the ones illustrated may be used. Some components may be optional.

The different components shown in FIGS. 3-4 may be illustrative examples of how components shown in block form in FIGS. 1-2 can be implemented as physical structures. Additionally, the different components shown in FIGS. 3-4 may be combined with components in FIG. 1, used with components in FIG. 1, or a combination of the two.

Figure 5:
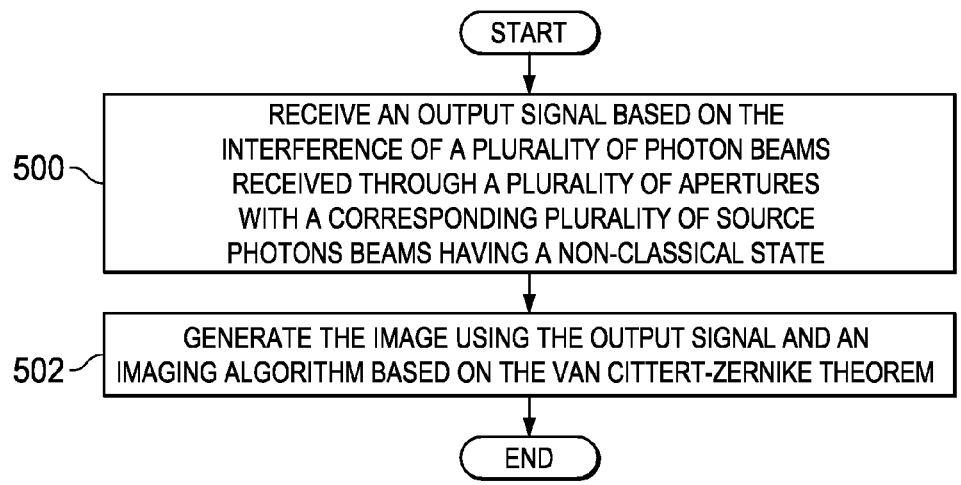
FIG. 5 is an illustration of a process for generating an image having an increased angular resolution in the form of a flowchart in accordance with an illustrative embodiment.

With reference now to FIG. 5, an illustration of a process for generating an image having an increased angular resolution in the form of a flowchart is depicted in accordance with an illustrative embodiment. The process illustrated in FIG. 5 may be implemented using, for example, without limitation, the image generator 110 in FIG. 1.

The process begins by receiving an output signal based on the interference of a plurality of photon beams received through a plurality of apertures with a corresponding plurality of source photon beams having a non-classical state (operation 500). In operation 500, the output signal received may be the output of the detector system of a sensor system. The output signal may be the output of, for example, the sensor system 102 described in FIG. 1.

The source photon beams may be formed from source photons emitted from a photon source. Fluctuations in the photon-number of each of the source photon beams may be reduced to within selected tolerances. In operation 500, the fluctuations in the photon-number of the source light may be reduced such that the statistical variance in the photon-number is within selected tolerances.

Next, the image is generated using the output signal and an imaging algorithm based on the Van Cittert-Zernike theorem (operation 502), with the process terminating thereafter. By using the source photon beams having the non-classical state and having reduced fluctuations in photon-number, the apertures in the sensor system that formed the output signal may be positioned such that the baseline of the apertures is sufficiently long to allow the image constructed to have a desired angular resolution. The angle of the angular resolution for the image generated in operation 502 may be, for example, without limitation, below about one nanoradian.

Figure 6:
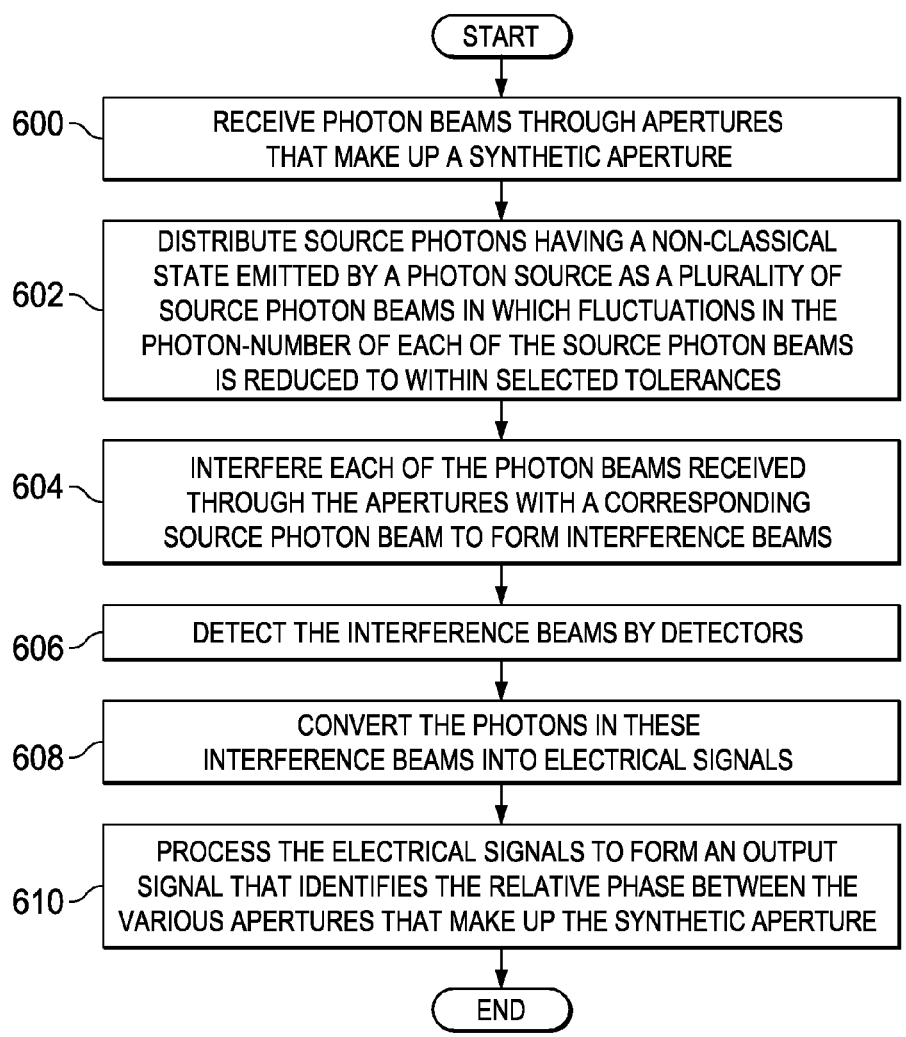
FIG. 6 is an illustration of a process for forming an output signal containing relative phase information for the light received through a synthetic aperture in the form of a flowchart in accordance with an illustrative embodiment.

With reference now to FIG. 6, an illustration of a process for forming an output signal containing relative phase information for the light received through a synthetic aperture in the form of a flowchart is depicted in accordance with an illustrative embodiment. The process illustrated in FIG. 6 may be performed using, for example, without limitation, the sensor system 102 in FIG. 1.

The process begins by receiving photon beams through apertures that make up a synthetic aperture (operation 600). The apertures may be arranged in some selected pattern such as, for example, an array.

Next, source photons having a non-classical state emitted by a photon source are distributed as a plurality of source photon beams in which fluctuations in the photon-number of each of the source photon beams are reduced to within selected tolerances (operation 602). In operation 602, the fluctuations in the photon-number of each of the source photon beams may be reduced such that the statistical variance in the photon-number is reduced to within selected tolerances. The source photon beams may be comprised of, for example, without limitation, source photons having a squeezed state.

Each of the photon beams received through the apertures may then be interfered with a corresponding source photon beam to form interference beams (operation 602). Operation 602 may be performed using, for example, one or more beamsplitters.

Thereafter, the interference beams may be detected by detectors (operation 606). The photons in these interference beams may be converted into electrical signals (operation 608). The electrical signals may be processed to form an output signal that identifies the relative phase between the various apertures that make up the synthetic aperture (operation 610), with the process terminating thereafter. The output signal formed on operation 610 may be, for example, the output signal received in operation 500 of FIG. 5.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
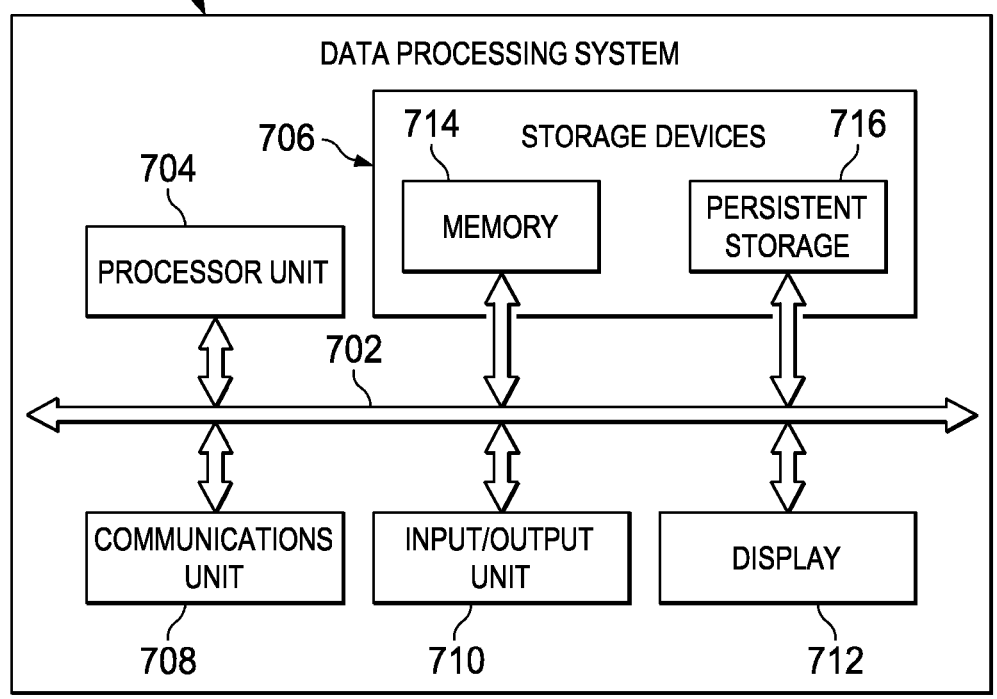
FIG. 7 is an illustration of a data processing system in the form of a block diagram in accordance with an illustrative embodiment.
Figure 7:
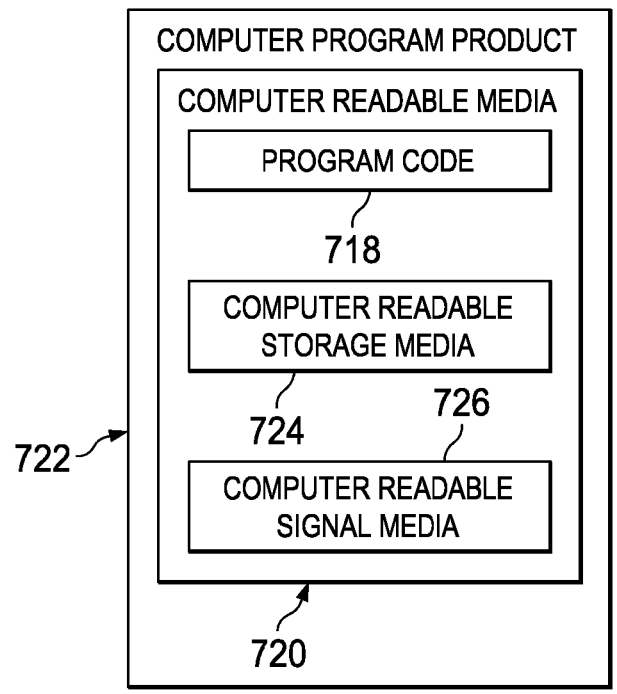

Turning now to FIG. 7, an illustration of a data processing system in the form of a block diagram is depicted in accordance with an illustrative embodiment. A data processing system 700 may be used to implement one or more computers in the computer system 142 in FIG. 1. As depicted, the data processing system 700 includes a communications framework 702, which provides communications between a processor unit 704, storage devices 706, a communications unit 708, an input/output unit 710, and a display 712. In some cases, the communications framework 702 may be implemented as a bus system.

The processor unit 704 is configured to execute instructions for software to perform a number of operations. The processor unit 704 may comprise a number of processors, a multi-processor core, and/or some other type of processor, depending on the implementation. In some cases, the processor unit 704 may take the form of a hardware unit, such as a circuit system, an application specific integrated circuit (ASIC), a programmable logic device, or some other suitable type of hardware unit.

Instructions for the operating system, applications, and/or programs run by the processor unit 704 may be located in the storage devices 706. The storage devices 706 may be in communication with the processor unit 704 through the communications framework 702. As used herein, a storage device, also referred to as a computer readable storage device, is any piece of hardware capable of storing information on a temporary and/or permanent basis. This information may include, but is not limited to, data, program code, and/or other information.

Memory 714 and persistent storage 716 are examples of the storage devices 706. The memory 714 may take the form of, for example, a random access memory or some type of volatile or non-volatile storage device. The persistent storage 716 may comprise any number of components or devices. For example, the persistent storage 716 may comprise a hard drive, a flash memory, a rewritable optical disk, a rewritable magnetic tape, or some combination of the above. The media used by the persistent storage 716 may or may not be removable.

The communications unit 708 allows the data processing system 700 to communicate with other data processing systems and/or devices. The communications unit 708 may provide communications using physical and/or wireless communications links.

The input/output unit 710 allows input to be received from and output to be sent to other devices connected to the data processing system 700. For example, the input/output unit 710 may allow user input to be received through a keyboard, a mouse, and/or some other type of input device. As another example, the input/output unit 710 may allow output to be sent to a printer connected to the data processing system 700.

The display 712 is configured to display information to a user. The display 712 may comprise, for example, without limitation, a monitor, a touch screen, a laser display, a holographic display, a virtual display device, and/or some other type of display device.

In this illustrative example, the processes of the different illustrative embodiments may be performed by the processor unit 704 using computer-implemented instructions. These instructions may be referred to as program code, computer usable program code, or computer readable program code and may be read and executed by one or more processors in the processor unit 704.

In these examples, program code 718 is located in a functional form on a computer readable media 720, which is selectively removable, and may be loaded onto or transferred to the data processing system 700 for execution by the processor unit 704. The program code 718 and the computer readable media 720 together form a computer program product 722. In this illustrative example, the computer readable media 720 may be computer readable storage media 724 or computer readable signal media 726.

The computer readable storage media 724 is a physical or tangible storage device used to store the program code 718 rather than a medium that propagates or transmits the program code 718. The computer readable storage media 724 may be, for example, without limitation, an optical or magnetic disk or a persistent storage device that is connected to the data processing system 700.

Alternatively, the program code 718 may be transferred to the data processing system 700 using the computer readable signal media 726. The computer readable signal media 726 may be, for example, a propagated data signal containing the program code 718. This data signal may be an electromagnetic signal, an optical signal, and/or some other type of signal that can be transmitted over physical and/or wireless communications links.

The illustration of the data processing system 700 in FIG. 7 is not meant to provide architectural limitations to the manner in which the illustrative embodiments may be implemented. The different illustrative embodiments may be implemented in a data processing system that includes components in addition to or in place of those illustrated for the data processing system 700. Further, components shown in FIG. 7 may be varied from the illustrative examples shown.

Thus the illustrative embodiments provide a method for generating an image having an improved angular resolution. In one illustrative embodiment, a method, apparatus, and system are provided for generating an image. Each of a plurality of photon beams received at a sensor system is interfered with a corresponding source photon beam in a plurality of source photon beams to form a plurality of interference beams. Each of the plurality of source photon beams has a non-classical state. Fluctuations in a photon-number of the each of the plurality of source photon beams are reduced. An output signal is formed based on the plurality of interference beams. The output signal is configured for use in generating the image having a desired angular resolution.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    receiving a plurality of photon beams at a sensor system, wherein the plurality of photon beams are from a far-field scene; wherein a first aperture receives a first photon beam in the plurality of photon beams and a second aperture receives a second photon beam in the plurality of photon beams; wherein the first aperture is physically separated from the second aperture;
    interfering each of the first photon beam and the second photon beam in the plurality of photon beams with a corresponding source photon beam in a plurality of source photon beams generated by a coherent source to form a plurality of interference beams, wherein each of the plurality of source photon beams has a non-classical state in which fluctuations in a photon-number of the each of the plurality of source photon beams is reduced to within selected tolerances; and
    forming an output signal based on the plurality of interference beams, wherein the output signal is configured for use in generating an image of the scene.

2. The method of claim 1 further comprising:
    receiving the plurality of photon beams through the first and second apertures in the sensor system, wherein the first and second apertures form a synthetic aperture in the sensor system.

3. The method of claim 2 further comprising:
    emitting source photons having the non-classical state from a photon source comprising the coherent source, wherein the source photons are distributed as the plurality of source photon beams.

4. The method of claim 3, wherein emitting the source photons having the non-classical state from the photon source comprises:
    emitting the source photons having the non-classical state from the photon source, wherein the non-classical state is a squeezed state.

5. The method of claim 3, wherein emitting the source photons having the non-classical state from the photon source comprises:
    emitting the source photons having the non-classical state from the photon source, wherein the photon source is configured to reduce the fluctuations in the photon-number of the each of the plurality of source photon beams such that a statistical variance in the photon-number is reduced to within selected tolerances.

6. The method of claim 2, wherein forming the output signal using the plurality of interference beams comprises:
    detecting the plurality of interference beams;
    generating a plurality of electrical signals in response to detecting the plurality of interference beams; and
    forming the output signal using the plurality of electrical signals, wherein the output signal includes relative phase information for the first and second apertures.

7. The method of claim 1 further comprising:
    reducing fluctuations in a relative phase between a photon beam in the plurality of photon beams and a source photon beam in the plurality of source photon beams corresponding to the photon beam in response to a reduction in the fluctuations in the photon-number of the each of the plurality of source photon beams.

8. The method of claim 1 further comprising:
    generating the image using the output signal.

9. The method of claim 8, wherein generating the image using the output signal comprises:
    sampling the output signal to form measurements;
    identifying an intensity distribution using the measurements and an imaging algorithm based on a Van Cittert-Zernike theorem; and
    generating the image using the intensity distribution in which the image has an angular resolution with an angle less than about one nanoradian.

10. An apparatus comprising:
    a photon source configured to emit source photons having a non-classical state, wherein the source photons are configured to be distributed as a plurality of source photon beams in which fluctuations in a photon-number of each of the plurality of source photon beams is reduced to within selected tolerances, and wherein the photon source is a coherent source; and
    a sensor system configured to receive a plurality of photon beams that are from a scene wherein the sensor system comprises a first aperture configured to receive a first photon beam in the plurality of photon beams and a second aperture configured to receive a second photon beam in the plurality of photon beams, wherein the first aperture is physically separated from the second aperture, and wherein the sensor system is configured to interfere, using a beam splitter, each of the first photon beam and the second photon beam in the plurality of photon beams with a corresponding source photon beam in the plurality of source photon beams to form a plurality of interference beams, and form an output signal based on the plurality of interference beams, wherein the output signal is configured for use in generating an image of the scene.

11. The apparatus of claim 10 further comprising:
    an image generator configured to receive the output signal and generate the image of the scene using the output signal, wherein the image has an angular resolution.

12. The apparatus of claim 11,
    wherein a physical separation between the first aperture and the second aperture forms a baseline, wherein the baseline determines an angular resolution of the sensor system, and
wherein the angular resolution is an angle less than about one nanoradian.

13. The apparatus of claim 10, wherein the non-classical state is a squeezed state.

14. The apparatus of claim 10, wherein:
the first aperture and the second aperture comprise a synthetic aperture configured to receive the plurality of photon beams originating from the scene and having a baseline within a selected range.

15. The apparatus of claim 10, wherein the sensor system comprises:
an interference system configured to interfere the each of the plurality of photon beams with the corresponding source photon beam in the plurality of source photon beams to form the plurality of interference beams.

16. The apparatus of claim 10, wherein the sensor system comprises:
a detector system configured to form a plurality of electrical signals in response to detecting the plurality of interference beams, wherein the output signal is formed using the plurality of electrical signals.

17. A system comprising:
a synthetic aperture configured to receive a plurality of photon beams that are from a scene, wherein the synthetic aperture comprises a first aperture configured to receive a first photon beam in the plurality of photon beams and a second aperture configured to receive a second photon beam in the plurality of photon beams, wherein the first aperture is physically separated from the second aperture;
an interference system configured to interfere, using a beam splitter, each of the first photon beam and the second photon beam in the plurality of photon beams with a corresponding source photon beam in a plurality of source photon beams having a non-classical state to form a plurality of interference beams, wherein fluctuations in a photon-number of each of the plurality of source photon beams are reduced to within selected tolerances; and
a detector system configured to detect the plurality of interference beams, wherein an output signal configured for use in generating an image of the scene is formed in response to detection of the plurality of interference beams.

18. The system of claim 17 further comprising:
a photon source configured to emit source photons having the non-classical state, wherein the source photons are configured to be distributed as the plurality of source photon beams and wherein a relative phase between the plurality of source photon beams is known.

19. The system of claim 17, wherein the synthetic aperture, the interference system, and the detector system are part of a sensor system and wherein the sensor system is configured to form the output signal configured for use in generating the image of the scene, wherein the image has a desired angular resolution.

20. The system of claim 17 further comprising:
an image generator configured to receive the output signal and generate the image of the scene using the output signal.

21. The method of claim 1, wherein:
a physical separation between the first aperture and the second aperture forms a baseline;
the baseline determines an angular resolution of the sensor system; and
the baseline determines a separation between a near-field region of the sensor system and a far-field region of the sensor system,
wherein the far-field region is greater than about twice the baseline squared over a wavelength of photons of the photon beams from the scene, and
wherein the near-field region is less than about twice the baseline squared over the wavelength of the photons of the photon beams from the scene.

22. The method of claim 7, wherein the photon source emits the plurality of source photon beams in a squeezed state to reduce the fluctuations.

23. A method comprising:
receiving a first photon beam from a far-field region of a scene at a first aperture of a sensor system and a second photon beam from the far-field region of the scene at a second aperture of the sensor system, wherein the first aperture is physically separated from the second aperture;
interfering the first photon beam with a first source photon beam to generate a first interference beam and a second interference beam, wherein the first photon beam is in a non-classical state;
interfering the second photon beam with a second source photon beam to generate a third interference beam and a fourth interference beam, wherein the second photon beam is in a non-classical state;
detecting the first interference beam at a first detector to generate a first output signal; detecting the second interference beam at a second detector to generate a second output signal;
detecting the third interference beam at a third detector to generate a third output signal; detecting the fourth interference beam at a fourth detector to generate a fourth output signal; and
generating an image of the scene using the first output signals, the second output signal, the third output signal, and the fourth output signal.

24. The method of claim 23, further comprising:
generating a first difference signal based on the first output signal from the first detector and the second output signal from the second detector and a second difference signal based on the third output signal from the third detector and the fourth output signal from the fourth detector;
identifying a relative phase difference between the first photon beam and the second photon beam using the first difference signal and the second difference signal; and
generating the image of the scene using the relative phase difference.

* * * * *